UNITED STATES PATENT OFFICE.

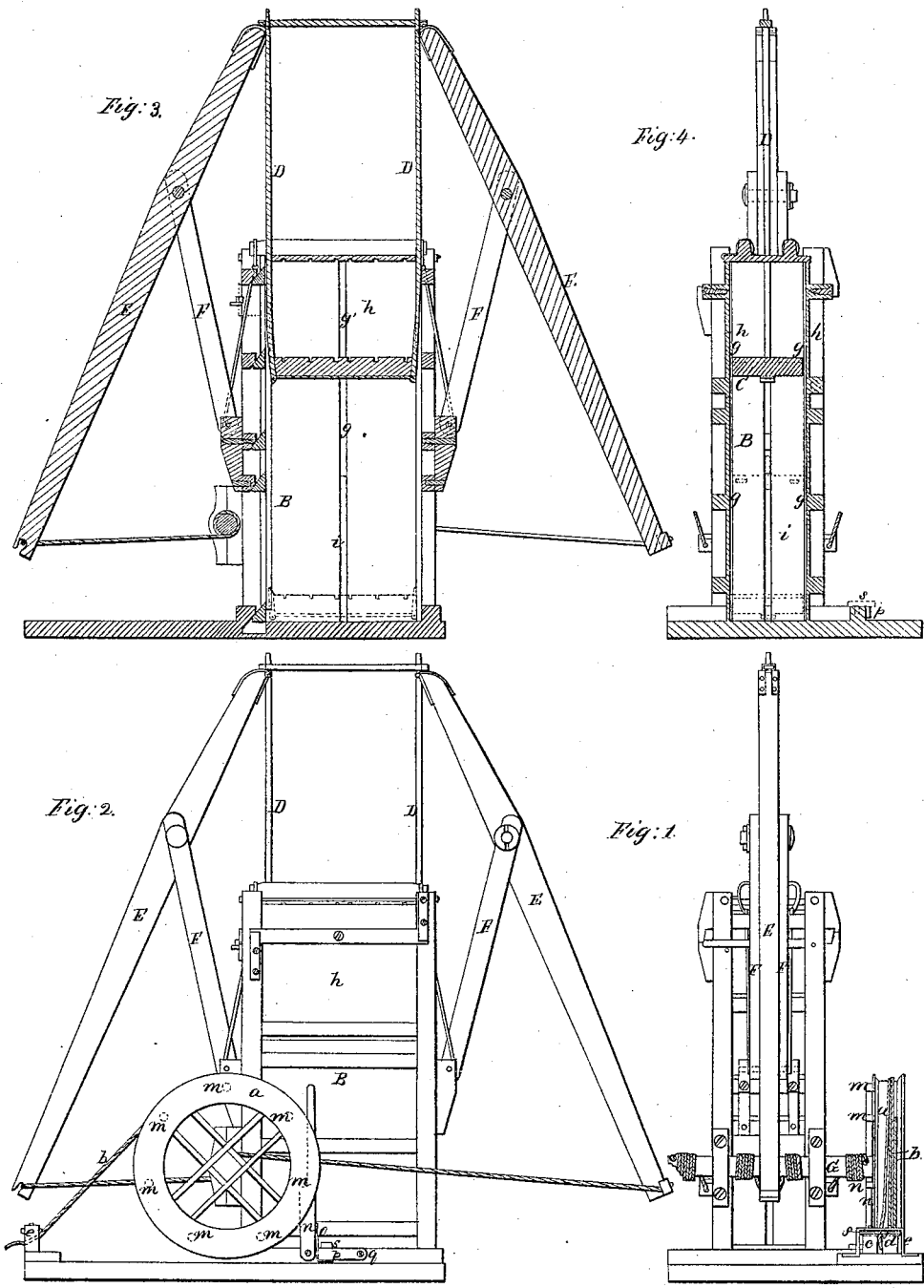

EDWARD A. FIELD, OF SIDNEY, MAINE.

IMPROVED HAY-PRESS.

Specification forming part of Letters Patent No. 51,709, dated December 26, 1865.

*To all whom it may concern:*

Be it known that I, EDWARD A. FIELD, of Sidney, of the county of Kennebec and State of Maine, have made a new and useful invention having reference to Hay-Presses and the pressing of hay thereby; and I do hereby declare the same to be fully described in the following specification, and represented in the accompanying drawings, of which—

Figure 1 is a side elevation of a hay-press provided with my invention. Fig. 2 is a front elevation of it; Fig. 3, a longitudinal section, and Fig. 4 a transverse section, of it.

The press is constructed substantially like various others in use, B being its hay-receiving box; C, the platen thereof; D D, the platen-lifters; E F, E F, the two sets of toggles or progressive levers, which are hinged to the platen-lifters and arranged on opposite sides of the press-box, and are operated by means of a windlass, G, and ropes leading therefrom and connected with the arms of the toggle-levers. The windlass-wheel $a$ has a traction-rope, $b$, affixed to and wound upon its periphery, such rope being led between two guide-rollers, $c\ d$, arranged in a frame, $e$, which is disposed somewhat in advance of the wheel.

Each of these rollers is provided with a flange or hoop, $f$, which projects beyond the surface of the roller, and is to prevent the rope from being drawn up against the upper part of the said frame, so as to be chafed thereby. These guide-rollers are also for preventing the horse or draft-animal attached to the free extremity of the traction-rope from drawing the rope over and off the side of the wheel while he may be in the act of moving in a direction at an angle with the plane of the wheel.

Each of the longer sides of the press-box I construct with a vertical groove, $g$, arranged on its inner surface and at the middle thereof, and I also construct each of the side doors, $h\ h$, of the press-box with another such groove, $g'$, which, when the door is closed, will be in prolongation of the groove $g$ beneath it. These grooves are intended to hold divisional boards or partitions $i$, which, when the platen is at its lowest position, should be placed in the said grooves, and so as to extend across the box and from one into the other of them. After the said board or boards may have been put in place the box may be supplied with hay, which may be packed into it on both sides of the partition, after which the partition or partitions may be removed from the mass of hay, which, when pressed, will be found to be separated through its middle. When two partitions are employed in the press-box the lower one of them may be withdrawn from the mass after the board may have been sufficiently raised by the platen to enable it to be pulled out of the hay and through one of the side-door openings of the box. The object of the partition or partitions, and the grooves for their reception, is to enable bundles or bales of hay to be pressed in such manner as to be capable of being easily divided or separated by simply sawing their holding boards or staves in the middle of each, as it frequently happens a purchaser of the hay may desire to purchase only half instead of the whole bale thereof, in which case my mode of pressing the hay or separating it preparatory to its being pressed will enable the seller of it to easily divide the bale.

From the inner face of the wheel $a$ there projects, at equal distances apart, a series of teeth or studs, $m\ m\ m$, they being made to operate with a retaining pawl-lever, $n$, formed and arranged as shown in Figs. 1 and 2. The said teeth or studs and pawl-lever are to so hold the wheel as to prevent the elastic power of the hay from depressing the platen in case the horse may slacken the draft on the traction-rope. The said pawl-lever is kept up to the series of studs by a spring, $o$, which is attached to an arm, $p$, that turns on a screw, $q$, going through the arm and being screwed into a beam, $r$, making part of the press-frame. A turn-button, $s$, placed on the top of the said beam $r$ serves, when turned over the arm, to hold it in a horizontal position, and with its spring against the pawl-lever. By means of the arm the spring may be so thrown out of action with the pawl-lever as to enable the latter to be turned back out of action with the series of studs of the wheel.

Having thus described my improved hay-press, what I claim therein as my invention is as follows:

1. The combination of the two opposite divisional grooves $g'$ $g'$, or their equivalents, with the press-box and the compressing mechanism thereof, such grooves being arranged therein as described, and so as to receive one or more divisional partitions, in manner and for the purpose set forth.

2. The combination of one or more divisional partitions, $i$, with the press-box and its platen or compressing machinery, and to operate therewith, substantially as and for the purpose as specified.

3. The combination and arrangement of the rotary arm $p$, or the same and its turn-button, with the spring $o$ of the pawl-lever applied to the series of teeth or studs of the windlass-wheel.

EDWARD A. FIELD.

Witnesses:
 R. H. EDDY,
 F. P. HALE, Jr.